United States Patent

Yamaguchi et al.

[11] Patent Number: 5,891,986
[45] Date of Patent: Apr. 6, 1999

[54] AROMATIC POLYIMIDE FILM AND ITS PRECURSOR COMPOSITION

[75] Inventors: Hiroaki Yamaguchi; Fumio Aoki, both of Chiba, Japan

[73] Assignee: Ube Industries, Ltd., Yamaguchi, Japan

[21] Appl. No.: 960,385

[22] Filed: Oct. 29, 1997

[30] Foreign Application Priority Data

Oct. 29, 1996 [JP] Japan .................................. 8-286767
Jun. 3, 1997 [JP] Japan .................................. 9-145033

[51] Int. Cl.$^6$ ...................................... C03G 73/10

[52] U.S. Cl. .................. 528/310; 528/125; 528/128; 528/172; 528/173; 528/179; 528/183; 528/220; 528/229; 528/322; 528/350; 528/353; 428/473.5

[58] Field of Search ................................. 528/179, 125, 528/310, 322, 228, 353, 172, 173, 183, 220, 229, 350; 428/473.5

[56] References Cited

U.S. PATENT DOCUMENTS

| | | | |
|---|---|---|---|
| 4,696,994 | 9/1987 | Nakajima et al. | 528/185 |
| 4,778,872 | 10/1988 | Sasaki et al. | 528/353 |
| 5,686,525 | 11/1997 | Maruta et al. | 528/353 |
| 5,719,253 | 2/1998 | Echigo et al. | 528/182 |

*Primary Examiner*—P. Hampton-Hightower
*Attorney, Agent, or Firm*—McAulay Nissen Goldberg Kiel & Hand, LLP

[57] ABSTRACT

An aromatic polyimide precursor composition advantageously employable for the production of an amorphous aromatic polyimide film having Tg of 300° C. or higher is composed of an aromatic tetracarboxylic acid component and an aromatic diamine component which are dissolved in an organic solvent, in which at least 60 mol. % of the aromatic tetracarboxylic acid component is 2,3,3',4'-biphenyltetracarboxylic acid, its monoester or diester of a primary alcohol, or their mixture, and at least 55 mol. % of the aromatic diamine component is 4,4'-diaminodiphenyl ether.

20 Claims, 2 Drawing Sheets

AROMATIC POLYIMIDE FILM AND ITS PRECURSOR COMPOSITION

FIELD OF THE INVENTION

The present invention relates to an amorphous aromatic polyimide film having a high glass transition temperature and an aromatic polyimide precursor composition advantageously employable for producing the polyimide film.

BACKGROUND OF THE INVENTION

An aromatic polyimide of condensation type is known to have high heat resistance, high electric insulation, high mechanical strength and high chemical resistance. Therefore, the aromatic polyimide is widely employed for preparing, for instance, a protective coat for an electronic part, a shielding membrane, or an interlayer insullation membrane. The aromatic polyimide is also employable in combination with a metal powder such as a silver powder or a copper powder to give an electroconductive paste, in combination with carbon black to give a resistance paste, or in combination with a colored pigment to give a colored ink.

The aromatic polyimide is generally produced by reacting an aromatic tetracarboxylic dianhydride or its derivative with an aromatic diamine in a polar organic solvent to give an aromatic polyamide acid (or polyamic acid, which is a precursor of an aromatic polyimide), coating the polyamide acid on a substrate or an article, and then heating the coated polyamide acid to 180°–450° C., optionally in the presence of a chemical imidation catalyst.

The polyamide acid solution shows an extremely high viscosity when its concentration is high. Therefore, the polyamide acid solution is generally adjusted to have a polyamide acid concentration of less than approximately 30 weight %. The polyamide acid solution having such a low concentration is disadvantageous when a relatively thick polyimide layer or film is manufactured.

U.S. Pat. No. 3,511,790, and Journal of Applied Polymer Science, Vol. 16, pp. 905–915 (1972) disclose a polyimide precursor solution (varnish) comprising a substituted benzophenonetetracarboxylic acid diester and an aromatic diamine which are dissolved in a polar organic solvent. Japanese Patent Publication No. 58-46276 and Japanese Patent Provisional Publication No. 62-227978 disclose an electroconductive paste employing the above-mentioned polyamide acid solution.

Japanese Patent Provisional Publication No. 61-42573 and Japanese Patent Provisional Publication No. 61-83229 (Japanese Patent Publication H4-1785) disclose a polyimide precursor solution which comprises an aromatic tetracarboxylic acid ester and an aromatic diamine having four benzene nuclei in its molecular structure (and optionally a diaminosiloxane). The polyimide obtained using the polyimide precursor solution shows a low glass transition temperature and a low heat decomposition temperature, and therefore shows relatively poor heat resistance.

SUMMARY OF THE INVENTION

It has been now discovered that an aromatic polyimide precursor composition of the invention which comprises an aromatic tetracarboxylic acid component and an aromatic diamine component in essentially equimolar amounts which are dissolved in a polar organic solvent, wherein the aromatic tetracarboxylic acid component comprises at least 60 mole % of 2,3,3',4'-biphenyltetracarboxylic acid, its monoester or diester of a primary alcohol, or their mixture, and the aromatic diamine component comprises at least 55 mole % of 4,4'-diaminodiphenyl ether shows a relatively low viscosity at room temperature even when it has a total monomer concentration of higher than 30 weight %.

The aromatic polyimide precursor solution of the invention is of value for preparing a highly heat resistant amorphous aromatic polyimide film having a glass transition temperature of not lower than 300° C.

It has been found that an aromatic polyimide film is satisfactorily produced by heating the aromatic polyimide precursor solution of the invention, while an aromatic polyimide precursor solution comprising 3,3',4,4'-biphenyltetracarboxylic acid or its ester and 4,4'-diaminodiphenyl ether in an organic solvent is apt to powder in the course of imidation reaction under heating for producing a polyimide film.

DETAILED DESCRIPTION OF THE INVENTION

Figure 1:
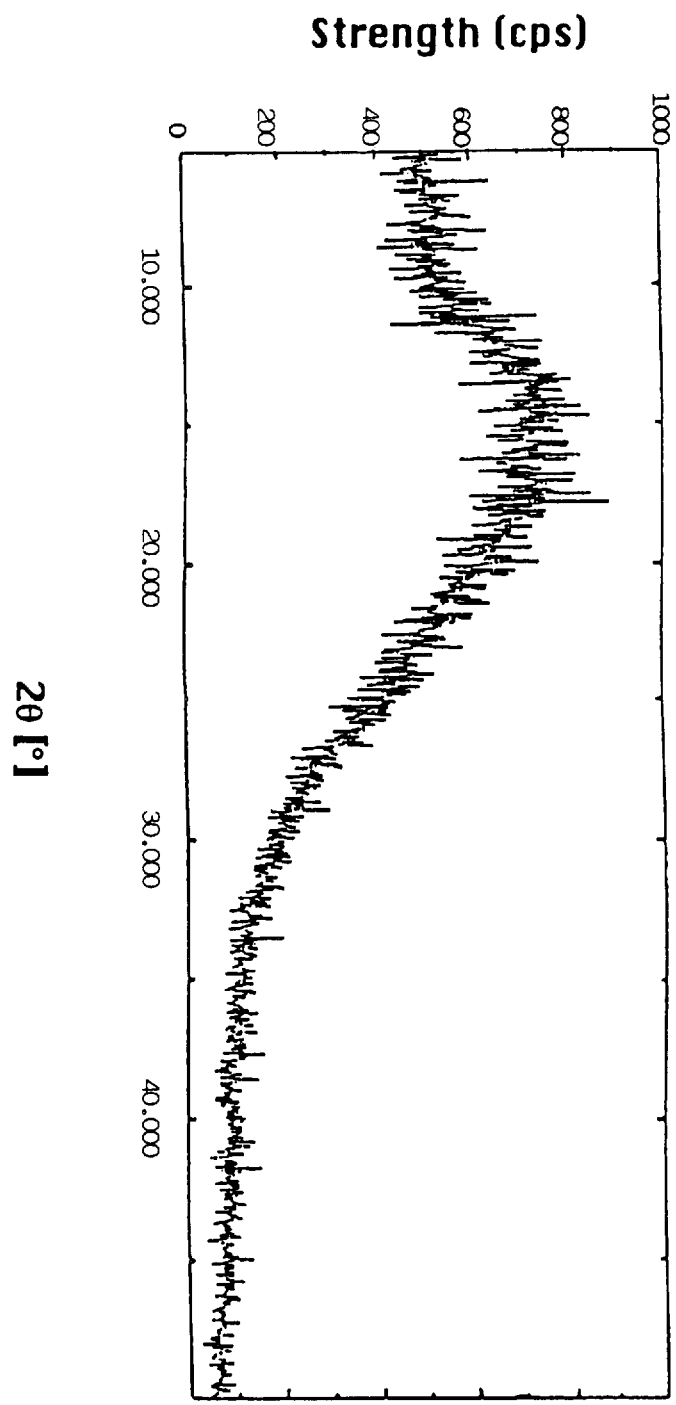
FIG. 1 is a wide angle X ray diffraction chart of one polyimide film of the invention.

Preferred embodiments of the invention are as follows.

1) The aromatic diamine component comprises at least 70 mole % of 4,4'-diaminodiphenyl ether.
2) The aromatic polyimide precursor composition has a logarithmic viscosity of not higher than 0.15 and contains the aromatic tetracarboxylic acid component and the aromatic diamine component in a total amount of 30 to 65 weight % of the composition.
3) The aromatic tetracarboxylic acid component comprises 2,3,3',4'-biphenyltetracarboxylic acid in the form of its monoester or diester of a primary alcohol, or their mixture, the primary alcohol being an aliphatic alcohol having 1 to 4 carbon atoms.
4) The aromatic diamine component further comprises at most 30 mole % of 1,3-bis(4-aminophenoxy)benzene.
5) The aromatic polyimide precursor composition further contains at least one of a silane coupling agent, a filler, and/or a surface tension-controlling agent.
6) The aromatic polyimide precursor composition further contains a metal powder and a surface active agent in amounts of 10 to 500 weight parts and 0.01 to 5 weight parts, respectively, per 100 parts of the total monomer amount (i.e., an amount of the aromatic tetracarboxylic acid component and the aromatic diamine component), and is a thixotropic composition.
7) The aromatic polyimide precursor composition further contains a carbon black or a semi-conductive powder in an amount of 10 to 500 weight parts per 100 parts of the total amount of the aromatic tetracarboxylic acid component and the aromatic diamine component, and is a thixotropic composition.
8) The aromatic polyimide precursor composition further contains a colored pigment and a surface active agent in amounts of 1 to 40 weight parts and 0.01 to 5 weight parts, respectively, per 100 parts of the total amount of the aromatic tetracarboxylic acid component and the aromatic diamine component.
9) The aromatic polyimide precursor composition which further contains an imidation catalyst such as triethylamine, ε-caprolactam, oxalic acid, phosphoric acid, and triphenyl phosphate.

The invention is further described below.

In the aromatic polyimide precursor composition of the invention, the aromatic tetracarboxylic acid component comprises at least 60 mole % of 2,3,3',4'-biphenyltetracarboxylic acid, its monoester or diester of a primary alcohol, or their mixture, and the aromatic diamine component comprises at least 55 mole % of 4,4'-diaminodiphenyl ether.

The main aromatic tetracarboxylic acid component, namely, 2,3,3',4'-biphenyltetracarboxylic acid, its monoester or diester of a primary alcohol, or their mixture can be synthesized independently. Otherwise, 2,3,3',4'-biphenyltetracarboxylic dianhydride can be caused to react with water or a primary alcohol in an equimolar amount or more at 60°–130° C. for a period of 10 min. to 5 hrs., to give the desired 2,3,3',4'-biphenyltetracarboxylic acid, its monoester or diester of a primary alcohol, or their mixture. In this reaction, it is not necessary to remove an excessive water or primary alcohol from the reaction mixture. However, the water or primary alcohol can be distilled off at 60°–130° C. using a stream of nitrogen gas, or at 50°–80° C. under reduced pressure. The 2,3,3',4'-biphenyltetracarboxylic acid or its ester can have one or more substituents such as halogen atoms on its benzene rings.

Examples of the primary alcohols include aliphatic alcohols having 1–4 carbon atoms such as methanol, ethanol, n-propanol and n-butanol, divalent alcohols such as ethylene glycol, 1,3-propanediol and 1,4-butanediol, methylcellosolve, and ethylcellosolve. Methanol and ethanol are preferred. Water and one or two kinds of primary alcohols can be employed in combination.

The resulting 2,3,3',4'-biphenyltetracarboxylic acid, its monoester or diester of a primary alcohol, or their mixture can be employed for producing a polyimide without isolating the product.

The 2,3,3',4'-biphenyltetracarboxylic acid or its ester can be employed in combination with one or more of other tetracarboxylic acids or their derivatives. Examples of the tetracarboxylic acids and their derivatives include 3,3',4,4'-biphenyltetracarboxylic acid, 3,3',4,4'-benzophenonetetracarboxylic acid, pyromellitic acid, 3,3',4,4'-diphenylmethanetetracarboxylic acid, 3,3',4,4'-diphenylethertetracarboxylic acid and 3,3',4,4'-diphenylsulfonetetracarboxylic acid, and their monoesters or diesters of a primary alcohol.

The aromatic diamine component comprises at least 55 mole %, preferably at least 70 mole %, of 4,4'-diaminodiphenyl ether. If the content of 4,4'-diaminodiphenyl ether is less than 55 mole %, the resulting polyimide hardly shows a glass transition temperature of lower than 300° C. Further, if 4,4'-diaminodiphenyl ether is employed in a less amount, the resulting polyimide film shows relatively poor characteristics such as low resistance to solvent which results in production of cracks.

The 4,4'-diaminodiphenyl ether can be employed in combination with a relatively small amount of one or more diamines. Examples of the diamines include aromatic diamines having one benzene nucleus such as p-phenylenediamine and m-phenylenediamine, aromatic diamines having two benzene nuclei such as 4,4'-diaminodiphenylmethane, 4,4'-diaminodiphenyl thioether, and 4,4'-diaminodiphenylsulfone, aromatic diamines having three benzene nuclei such as 1,4-bis(4-aminophenoxy) benzene and 1,3-bis(4-aminophenoxy)benzene, and aromatic diamines having four benzene nuclei such as 2,2-bis [4-(4-aminophenoxy)phenyl]propane, 4,4'-(4-aminophenoxy)diphenylsulfone, and (4-aminophenoxy) biphenyl. Also employable are diaminopolysiloxanes such as ω,ω'-bis(2-aminoethyl)polydimethylsiloxane, ω,ω'-bis(3-aminopropyl)polydimethylsiloxane, ω,ω'-bis(3-aminobutyl) polydimethylsiloxane, ω,ω'-bis(4-aminophenyl) polydimethylsiloxane, ω,ω'-bis(4-amino-3-methylphenyl) polydimethylsiloxane, and ω,ω'-bis(3-amino-3propyl) polydiphenylsiloxane. These diaminopolydimethylsiloxane preferably has a polymerization degree of 2–30.

Examples of the polar organic solvents include N-methyl-2-pyrrolidone, N-vinyl-2-pyrrolidone, N-cyclohexyl-2-pyrrolidone, N,N-dimethylformamide, N,N-dimethylacetamide, N,N-dimethylsulfoxide, hexamethylphosphoramide, sulfolane, and 1,3-dimethyl-2-imidazolidinone. The organic solvent is preferably employed in an amount to give a monomer concentration (i.e., total concentration of the aromatic tetracarboxylic acid component and the aromatic diamine component) of not less than 30 weight %.

The aromatic tetracarboxylic acid component and the aromatic diamine component are employed in essentially equimolar amounts, that is, approximately one mole per one mole relationship. For instance, the aromatic diamine component is added to a solution of the aromatic tetracarboxylic acid component in a polar organic solvent, and the resulting mixture is stirred, for instance, at room temperature to 100° C. for 1 to 10 hours.

The polyimide precursor solution of the invention preferably shows a logarithmic viscosity ($\eta_{inh}$) of not more than 0.15. This means that almost no condensation product (i.e., polyamide acid) is produced. The logarithmic viscosity can be determined according to the following equation:

$$\eta_{inh} = ln(T/T_0)/C$$

wherein C=total monomer concentration×amount of the solution for determination/volume of the solution for determination (g/dL)

T=time period for dropping the sample $T_0$=time period for dropping N-methyl-2-pyrrolidone Total monomer concentration=weight after heating the solution to 350° C. for 30 min./weight before heating Unit of concentration: weight %

Unit of weight: g

Unit of volume: dL

Unit of time period: sec.

The polyimide precursor composition of the invention can be coated on a substrate or an article and then subjected to staged heating from 60° to 400° C. for progress of imidation and increase of molecular weight. The highest heating temperature is preferably set to a temperature higher than the glass transition temperature of the resulting polyimide.

It is generally considered that a condensation reaction between an aromatic carboxylic acid and an aromatic diamine hardly proceeds in the absence of a strong dehydrating catalyst. Therefore, it is assumed that the aromatic tetracarboxylic acid or its mono- or diester of the composition of the invention is first dehydrated or dealcoholated to give an acid anhydride, the acid anhydride is then reacted with the amino group of the aromatic diamine component to give a polyamide acid (polyamic acid), and the polyamide acid is finally dehydrated to perform the imidation (i.e., imide ring closure). For performing the sequential reactions smoothly, it is important to choose an appropriate combination of an aromatic tetracarboxylic acid component and an aromatic diamine component.

The above-mentioned sequential reactions can be accelerated by addition of a catalyst (i.e., imidation catalyst) such as a basic compound (e.g., triethylamine or 2-methylimidazole), a lactam (e.g., ε-caprolactam), or an acid or its ester (e.g., oxalic acid, phosphoric acid, triphenyl phosphate). The imidation catalyst is generally employed in an amount of 0.01 to 5 % based on the total monomer amount. The catalyst can be added in any stages of the reactions for producing the polyimide. The catalyst can also serve as a hydrolyzing catalyst or an 35 esterifying catalyst. Therefore, the catalyst is preferably added to an aromatic tetracarboxylic dianhydride solution to be subjected to hydrolysis and esterification.

The polyimide precursor composition of the invention shows a relatively low viscosity at room temperature even when the total monomer content (i.e., total content of the aromatic tetracarboxylic acid component and aromatic diamine component) is high, and its low viscosity does not change in a long term storage at room temperature. Therefore, it is not required to severely control the conditions for coating procedure, such as an ambient temperature and humidity.

The polyimide precursor composition of the invention can be converted to a polyimide film which is closely and strongly bonded on a variety of substrates or articles. However, the resulting polyimide film shows a relatively poor bonding to substrates containing Si atom therein, such as substrates of glass, Si-metal, and $SiO_2$. Therefore, a silane coupling agent is advantageously incorporated into the polyimide precursor composition of the invention. A preferred silane coupling agent comprises an amino group, an isocyanate group, a urea group, and/or an amide group in its molecular structure. The silane coupling agent is preferably incorporated into the polyimide precursor composition in an amount of 0.1 to 5 weight % per the total amount of the precursor composition.

The polyimide precursor composition of the invention can be given an appropriate thixotropic property by addition of a fine silica powder or the like. The thixotropic polyimide precursor composition can be applied to a substrate by a screen printing method so that a coating film having a fine pattern can be formed.

A surface tension-controlling agent can be incorporated into the polyimide precursor composition for improving its leveling property or improving its surface conditions. A commercially available leveling agent, defoaming agent or coating defect-improving agent (e.g., BM-1100, commercially available from BM Chemie) can be utilized. Preferred are non-silicone type additives such as a higher fatty acid ester of glycerol, a borate of a higher fatty alcohol, and a fluorine atom-containing surface active agent. The surface tension-controlling agent can be incorporated in an amount of 0.01 to 1 weight % per the total amount of the precursor composition.

The polyimide( precursor composition of the invention is well compatible with various fillers, and therefore can be favorably employable as a binder for various fillers.

For instance, a metal powder such as a powder of silver, gold, copper or aluminum can be incorporated into the precursor composition in an amount of 10 to 500 weight %, preferably 50 to 500 weight %, based on the total monomer amount, to give an electroconductive paste having a thixotropic property. In this case, a surface active agent (e.g., a fluorine-containing surface active agent such as the commercially available Schwego Fluor 8038, available from Bernd Schvegmann) in an amount of 0.01 to 5 weight % based on the total monomer amount. The electroconductive paste can be favorably utilized for chip bonding or for-nation of electroconductive layer of electronic parts. Carbon black or a semiconductive filler such as stannic oxide can be incorporated into the precursor composition to give a heat resistant, thixotropic paste for preparing a resistance body, for instance, for formation of printed resistance surface, surface exothermic body, antistatic body, or surface protective coat.

The polyimide precursor composition of the invention can contain a ceramic powder such as a powder of silica or alumina to give a thixotropic composition.

The polyimide precursor composition of the invention an be utilized in combination with colored pigments such as RGB pigments (e.g., phthalocyanine pigment, perylene pigment, and azo pigment). The colored pigment can be incorporated into the precursor composition in an amount of 1 to 40 weight % based on the total monomer amount. In the composition, 0.01 to 5 weight % (based on the total monomer amount) of a surface active agent is preferably incorporated. The resulting composition can be employed a colored ink.

The polyimide precursor composition per se (after dilution if necessary) can be coated on a substrate by spin coating.

The polyimide precursor composition of the invention can be heated to give an amorphous aromatic polyimide film having a high glass transition temperature (Tg) of not lower than 300° C. The amorphous polyimide film can be confirmed by wide angle X ray diffraction measurement. The amorphous polyimide film of the invention gives a broad halo (obscure band) showing a peak around $2\theta=17°$ (which is produced by scattering in amorphous structure) and showing no sharp peak (half width of less than 5°, which is produced by scattering in crystalline structure). The high glass transition temperature of not lower than 300° C. is very important, because an aromatic polyimide film is sometimes brought into contact with a soldering bath of approximately 300° C. when it is employed as a material for constituting electronic parts.

The aromatic polyimide film shows an improved heat stability such as having a heat decomposition temperature (temperature at which 3 weight % decrease is observed, in nitrogen gas) of 530° C. or higher. The high heat decomposition temperature is very important, because the polyimide film is sometimes exposed to high temperatures in the course of the preparation of electronic parts in which metal or ceramic is vapor deposited or sputtered on the polyimide film. The aromatic polyimide film of the invention emits almost no decomposition gas under such severe conditions. The decomposition gas sometimes causes deformation of the electronic products or decreases bonding strength between the polyimide film and a metallic or ceramic film.

The present invention is further described by the following examples. In the examples, the following abbreviations are employed.

a-BPDA: 2,3,3',4'-biphenyltetracarboxylic dianhydride
s-BPDA: 3,3',4,4'-biphenyltetracarboxylic dianhydride
NMP: N-methyl-2-pyrrolidone
DADE: 4,4'-diaminodiphenyl ether
BAPP: 2,2-bis[4-(4-aminophenoxy)phenyl]propane The produced polyimide films were evaluated in their chemical and physical property by the following methods:
Tensile modulus: ASTM D-882
Tensile elongation: ASIM D-882

Yield strength: ASTM D-882

3% Weight loss temperature: using TGA, in $N_2$ gas, at a temperature elevation of 20° C./min.

Glass transition temperature (Tg): by DSC, in $N_2$ gas, at a temperature elevation of 10° C./min.

Volume resistance: using Yokokawa Hewlett Packard 4329A, and insulation agent of 16008A, measured at 23° C.

Surface resistance: same as above

Dielectric constant: using Yokokawa Hewlett Packard 4277A, and LCZ meter, measured at 23° C.

Dielectric loss tangent: same as above

Water absorption: calculated from weight increase after immersion in water at 23° C. for 24 hours Bonding of coated film to substrate (Cross-cut peeling): 100 cross-cuts are formed on a film coated on a substrate at 1 mm spaces; an adhesive tape is placed on the coated film having cross-cuts; and the adhesive tape is peeled at 90° angle to count the film portions remaining on the substrate.

EXAMPLE 1

In a three necked-500 mL volume flask equipped with a reflux condenser, a $N_2$ inlet tube, and a stirrer were placed 70 g (0.2379 mol.) of a-BPDA, 22.8 g (0.713 mol.) of methanol, 107 g of NMP, and 1 g of ε-caprolactam. The mixture was heated on an oil bath (heated to 90° C.) under a stream of $N_2$. The mixture was turned to a clear liquid at a lapse of 30 min. After the heating for one hour, the reflux condenser was replaced with a fractionating column and the temperature of the oil bath was increased to 120° C., so that most of excessive methanol and a portion of NMP were distilled off for a period of 2 hours. The heated mixture was then cooled to 70° C., and 47.63 g (0.2379 mol.) of DADE was added. The mixture was stirred for 3 hours to give 237 g of a clear viscous yellow brown oil. The viscous oil had a viscosity of 40 poise (E type viscometer, at 30° C.), a monomer concentration of 46 wt. %, and $\eta_{inh}$ of 0.074. The resulting viscous oil was named Composition A.

A coated film defect improver (BM-1100, available from BM Chemie) was added to Composition A in an amount of 0.1 wt. %. The resulting composition was coated on a glass plate by means of an applicator. The coated composition was stepwise heated at 80° C. for 10 min., at 120° C. for 10 min., at 180° C. for 10 min., and finally at 350° C. for 30 min., to give a polyimide film of 50 μm thick. Then, the polyimide film was peeled off the glass plate.

The polyimide structure was confirmed by the presence of peaks at 1780 $cm^{-1}$ and 1720 $cm^{-1}$ in an IR chart. The amorphous structure was confirmed by a wide angle X ray diffraction chart in which only a broad band at 2θ=17° due to scattering in a non-crystalline structure was observed. The diffraction chart is shown in the attached FIG. 1.

The chemical and physical characteristics of the polyimide are shown below.

Tensile modulus: 280 $kgf/mm^2$
Tensile elongation: 25%
Yield strength: 11.5 $kgf/mm^2$
3% Weight loss temp.: 550° C.
Glass transition temperature (Tg): 335° C.
Volume resistance: $2 \times 10^{17}$ Ω·cm
Surface resistance: $5 \times 10^{15}$ Ω
Dielectric constant: 3.4 ($10^3$ HZ)
Dielectric loss tangent: 0.0015 ($10^3$ HZ)
Water absorption: 1.2 wt. %

EXAMPLE 2

The procedures of Example 1 were repeated except for replacing 22.8 g of methanol and 107 g of NMP with 12.85 g (0.7137 mol.) of water and 185 g of NMP, respectively, to give 311 g of a clear viscous yellow brown oil.

The viscous oil had a viscosity of 3.3 poise, a monomer concentration of 35 wt. %, and Ash of 0.070.

To the viscous oil was added 0.1 wt. % of BM-1100 in the same manner as in Example 1, and the resulting viscous composition was treated in the same manner as in Example 1, to give a polyimide film of 35 μm thick.

The produced polyimide film has almost the same chemical and physical characteristics as those of the polyimide film of Example 1.

EXAMPLE 3

To Composition A of Example 1 were added 0.1 wt. % of BM-1100 and 0.5 wt. % of a silane coupling agent (KBE-903, available from Shin-Etsu Silicone Co., Ltd.). The resulting composition was coated on a glass plate in the same manner as in Example 1 to give a polyimide film (coated film) of 20 μm thick.

The evaluation of bonding of the coated film to the glass plate:

100/100 (no peeled film was observed) 100/100 --- after boiling in water for 2 hrs.

EXAMPLE 4

The procedures of Example 1 were repeated except for replacing 47.63 g (0.2379 mol.) of DADE with a combination of 38.10 g (0.1903 mol.) of DADE and 13.90 g (0.0476 mol.) of 1,3-bis(4-aminophenoxy)benzene. Total molar amount of the diamine components was 0.2379 mol. The procedures gave 241 g of a clear viscous yellow brown oil.

The viscous oil had a viscosity of 25 poise, a monomer concentration of 47 wt. %, and $\eta_{inh}$ of 0.072. The resulting viscous oil was named Composition B.

To the viscous oil was added 0.1 wt. % of BM-1100 in the same manner as in Example 1, and the resulting viscous composition was treated in the same manner as in Example 1, to give a polyimide film of 50 μm thick. Then, the polyimide film was peeled off the glass plate.

Figure 2:
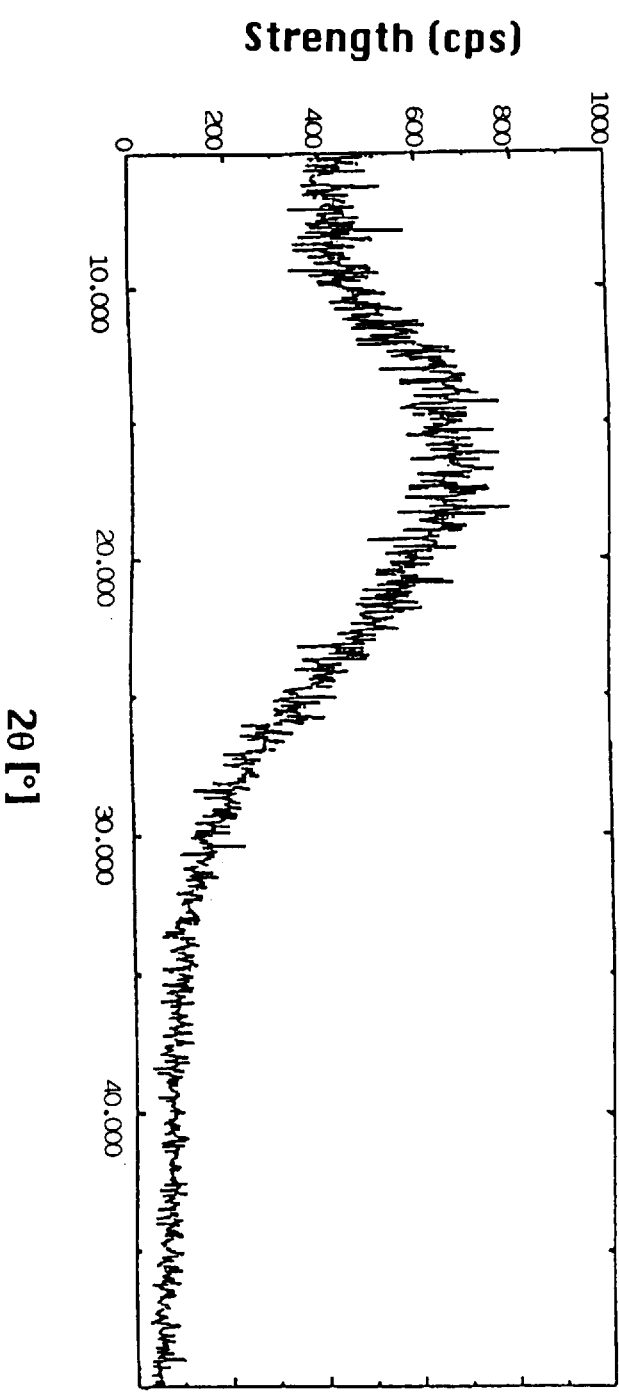
FIG. 2 is a wide angle X ray diffraction chart of another polyimide film of the invention.

The polyimide structure was confirmed by the presence of peaks at 1780 $cm^{-1}$ and 1720 $cm^{-1}$ in an IR chart. The amorphous structure was confirmed by a wide angle X ray diffraction chart in which only a broad band at 2θ=17° due to scattering in a non-crystalline structure was observed. The diffraction chart is shown in the attached FIG. 2.

The chemical and physical characteristics of the polyimide are shown below.

Tensile modulus: 280 $kgf/mm^2$
Tensile elongation: 35%
Yield strength: 11.3 $kgf/mm^2$
3% Weight loss temp.: 545° C.
Glass transition temperature (Tg): 304° C.
Volume resistance: $2 \times 10^{17}$ Ω·cm
Surface resistance: $5 \times 10^{15}$ Ω
Dielectric constant: 3.3 ($10^3$ HZ)

Dielectric loss tangent: 0.0015 ($10^3$ HZ)
Water absorption: 1.1 wt. %

COMPARISON EXAMPLE 1

The procedures of Example 1 were repeated except for replacing 70 g (0.2379 mol.) of a-BPDA with 70 g (0.2379 mol.) of s-BPDA, to give 236 g of a clear viscous yellow brown oil. The viscous oil had a viscosity of 45 poise, a monomer concentration of 46 wt. %, and $\eta_{inh}$ of 0.076.

The resulting viscous oil was coated on a glass plate in the same manner as in Example to prepare a polyimide film. However, it was observed that the coated composition turned to powder in the heating step at approximately 150° C. and finally a powdery coated film was produced. Therefore, the chemical and physical characteristics of the produced film could not be performed.

The wide angle X ray diffraction spectroscopy of the produced film indicated that the film had a crystalline structure because three sharp peaks at $2\theta=14.5°$, $16.5°$ and $18.50°$ (which were assigned to peaks of scattering in crystalline structure) were observed.

COMPARISON EXAMPLE 2

A polyimide precursor composition was prepared from s-BPDA and BAPP in the manner as described in Japanese Patent Provisional Publication No.61-42573.

The polyimide precursor composition was then heated to give a polyimide film which had a glass transition temperature of 246° C. and a 3% weight loss temperature of 495° C.

EXAMPLE 5

To 100 g of Composition A of Example 1 were added 15 g of a alumina fine powder (Al$_2$O$_3$-C, available from Nippon Aerogil Co., Ltd., mean particle size: 20 nm), 5 g of a silica fine powder (A-972N, available from Nippon Aerogil Co., Ltd., mean particle size: 20 nm), and 1 g of a silane coupling agent (KBE-603, available from Shin-Etsu Silicone Co., Ltd.). The mixture was kneaded in a three-roll mill to give a paste for screen printing.

The resulting paste showed viscosity values of 620 poise (0.5 r.p.m.) and 510 poise (5 r.p.m) at 30° C. in the measurement using E type viscometer and 3 degree corn. The thixotropy index was 1.21.

The paste was coated on a glass plate using a 200 mesh screen printing film on which circular patterns of diameters of 0.2 mm, 0.3 mm, 0.5 mm and 0.7 mm (80 circles each) were formed. The coated paste was heat-treated in the same manner as in Example 1 to give a via-hole pattern. A good relief pattern in which every via-hole had a good opening was produced. An average difference of the diameter of opening of the formed via-hole from the diameter of the circular hole of the printing film was 25 µm. The difference was caused by flowing-in of the coated paste into the hole. The thickness of the formed patter was 15 µm on the flat area.

The evaluation of bonding of the coated film to the glass plate:

100/100 (no peeled film was observed)

100/100 --- after boiling in water for 2 hrs.

EXAMPLE 6

To Composition B of Example 4 were added 10 g of a silica fine powder (A-130, available from Nippon Aerogil Co., Ltd., mean particle size: 20 nm), and the resulting mixture was kneaded in a three-roll mill to give a paste for screen printing.

The resulting paste showed viscosity values of 695 poise (1 r.p.m.) and 288 poise (10 r.p.m) at 30° C. The thixotropy index was 3.05.

The paste was coated on a sintered alumina plate using a screen printing film of Example 5 and heat-treated in the same manner as in Example 1 to give a via-hole pattern. A small number of the via-hole pattern having the smallest diameter (0.2 mm) were closed, but most of the via-holes had a good opening pattern. An average difference of the diameter of opening of the formed via-hole from the diameter of the circular hole of the printing film was 50 µm. The thickness of the formed patter was 15 µm on the flat area.

The evaluation of bonding of the coated film to the glass plate:

100/100 (no peeled film was observed)

100/100 --- after boiling in water for 2 hrs.

EXAMPLE 7

The procedures of Example 1 were repeated except for changing the amount of methanol from 22.8 g to 16.77 g (0.5234 mol.) for forming a diester without distilling the excessive methanol off. The reaction mixture was cooled to 60° C. To the cooled mixture were added 38.10 g (0.1903 mol.) of DADE and 13.90 g (0.0476 mol.) of 1,3-bis(4-aminophenoxy)benzene. Total molar amount of the diamine components was 0.2349 mol. The procedures gave 243 g of a clear viscous yellow brown oil.

The viscous oil had a viscosity of 20 poise, a monomer concentration of 46.7 wt. %, and $\eta_{inh}$ of 0.061. The resulting viscous oil was named Composition C.

To 100 g of the viscous oil were added 10 g of a silica fine powder (A-130, available from Nippon Aerogil Co., Ltd., mean particle size: 20 nm) and 0.1 g of a glycerol ester of higher fatty acid (Ekicel, available from Kao Corporation), and the resulting mixture was kneaded in a three-roll mill to give a paste for screen printing.

The resulting paste showed viscosity values of 220 poise (1 r.p.m.) and 120 poise (10 r.p.m) at 30° C. The thixotropy index was 1.83.

The paste was coated on a sintered alumina plate using a screen printing film of Example 5 and heat-treated in the same manner as in Example 1 to give a via-hole pattern. A small number of the via-hole pattern having the smallest diameter (0.2 mm) were closed, but most of the via-holes had a good opening pattern. An average difference of the diameter of opening of the formed via-hole from the diameter of the circular hole of the printing film was 50 µm. The thickness of the formed patter was 15 µm on the flat area.

The evaluation of bonding of the coated film to the glass plate:

100/100 (no peeled film was observed)

100/100 --- after boiling in water for 2 hrs.

Example 8

The pot-life of Composition C of Example 7 was evaluated. The evaluation was made using E-type viscometer to measure a viscosity at the lapse of one week, three months, and six months. The viscosity was expressed after standardizing the viscosity measured just after the preparation of the paste was 100. Simultaneously, the pot life of an aromatic polyamide acid solution having a polymer concentration of 18 wt. % was evaluated.

The results are give below.

Pot-life of the paste of Example 7:
100 (just after preparation)—105 (1 week) —107 (3 months)—110 (6 months)

Pot-life of the polyamide acid solution:
100 (just after preparation)—50 (1 week) —25 (3 months)

As is clear from these results, the polyimide precursor composition showed almost no viscosity change.

What is claimed is:

1. An aromatic polyimide precursor composition comprising an aromatic tetracarboxylic acid component and an aromatic diamine component in essentially equimolar amounts which are dissolved in a polar organic solvent, wherein the aromatic tetracarboxylic acid component comprises at least 60 mole % of 2,3,3',4'-biphenyltetracarboxylic acid, its monoester or diester of a primary alcohol, or their mixture, and the aromatic diamine component comprises at least 55 mole % of 4,4'-diaminodiphenyl ether, said composition having a logarithmic viscosity of not higher than 0.15 and contains the aromatic tetracarboxylic acid component and the aromatic diamine component in a total amount of 30 to 65 weight % of the composition.

2. The aromatic polyimide precursor composition of claim 1, wherein the aromatic diamine component comprises at least 70 mole % of 4,4'-diaminodiphenyl ether.

3. The aromatic polyimide precursor composition of claim 1, wherein the aromatic tetracarboxylic acid component comprises 2,3,3',4'-biphenyltetracarboxylic acid in the form of its monoester or diester of a primary alcohol, or their mixture, the primary alcohol being an aliphatic alcohol having 1 to 4 carbon atoms.

4. The aromatic polyimide precursor composition of claim 1, wherein the aromatic diamine component further comprises at most 30 mole % of 1,3-bis(4-aminophenoxy)-benzene.

5. The aromatic polyimide precursor composition of claim 1, which further contains at least one of a silane coupling agent, a filler, or a surface tension-controlling agent.

6. The aromatic polyimide precursor composition of claim 1, which further contains a metal powder and a surface active agent in amounts of 10 to 500 weight parts and 0.01 to 5 weight parts, respectively, per 100 parts of the total amount of the aromatic tetracarboxylic acid component and the aromatic diamine component, and is a thixotropic composition.

7. The aromatic polyimide precursor composition of claim 1, which further contains a carbon black or a semi-conductive powder in an amount of 10 to 500 weight parts per 100 parts of the total amount of the aromatic tetracarboxylic acid component and the aromatic diamine component, and is a thixotropic composition.

8. The aromatic polyimide precursor composition of claim 1, which further contains a colored pigment and a surface active agent in amounts of 1 to 40 weight parts and 0.01 to 5 weight parts, respectively, per 100 parts of the total amount of the aromatic tetracarboxylic acid component and the aromatic diamine component.

9. The aromatic polyimide precursor composition of claim 1, which further contains an imidation catalyst selected from the group consisting of triethylamine, ε-caprolactam, oxalic acid, phosphoric acid, and triphenyl phosphate.

10. An amorphous aromatic polyimide film which has a glass transition temperature of not lower than 300° C. and is prepared by heating an aromatic polyimide precursor composition comprising an aromatic tetracarboxylic acid component and an aromatic diamine component in essentially equimolar amounts which are dissolved in a polar organic solvent, wherein the aromatic tetracarboxylic acid component comprises at least 60 mole % of 2,3,3',4'-biphenyltetracarboxylic acid, its monoester or diester of a primary alcohol, or their mixture, and the aromatic diamine component comprises at least 55 mole % of 4,4'-diaminodiphenyl ether.

11. The amorphous aromatic polyimide film of claim 10, wherein the aromatic diamine component comprises at least 70 mole % of 4,4'-diaminodiphenyl ether.

12. The amorphous aromatic polyimide film of claim 10, wherein the aromatic polyimide precursor composition has a logarithmic viscosity of not higher than 0.15 and contains the aromatic tetracarboxylic acid component and the aromatic diamine component in a total amount of 30 to 65 weight % of the composition.

13. The amorphous aromatic polyimide film of claim 11, wherein the aromatic diamine component further comprises at most 30 mole % of 1,3-bis(4-aminophenoxy)-benzene.

14. The amorphous aromatic polyimide film of claim 10, which further contains at least one of a silane coupling agent, a filler, or a surface tension-controlling agent.

15. The amorphous aromatic polyimide film of claim 10, which further contains a metal powder and a surface active agent in amounts of 10 to 500 weight parts and 0.01 to 5 weight parts, respectively, per 100 parts of the total amount of the aromatic tetracarboxylic acid component and the aromatic diamine component.

16. The amorphous aromatic polyimide film of claim 10, which further contains a carbon black or a semi-conductive powder in an amount of 10 to 500 weight parts per 100 parts of the total amount of the aromatic tetracarboxylic acid component and the aromatic diamine component.

17. The amorphous aromatic polyimide film of claim 10, which further contains a colored pigment and a surface active agent in amounts of 1 to 40 weight parts and 0.01 to 5 weight parts, respectively, per 100 parts of the total amount of the aromatic tetracarboxylic acid component and the aromatic diamine component.

18. The amorphous aromatic polyimide film of claim 10, which is produced by stepwise heating the aromatic polyimide precursor composition to a temperature higher than a glass transition temperature of the resulting film.

19. An aromatic polyimide precursor composition comprising an aromatic tetracarboxylic acid component and an aromatic diamine component in essentially equimolar amounts which are dissolved in a polar organic solvent, wherein the aromatic tetracarboxylic acid component comprises at least 60 mole % of 2,3,3',4'-biphenyltetracarboxylic acid, its monoester or diester of a primary alcohol, or their mixture, and the aromatic diamine component comprises at least 55 mole % of 4,4'-diaminodiphenyl ether, wherein the aromatic diamine component further comprises at most 30 mole % of 1,3-bis(4-aminophenoxy)-benzene.

20. An amorphous aromatic polyimide film which has a glass transition temperature of not lower than 300° C. and is prepared by heating an aromatic polyimide precursor composition comprising an aromatic tetracarboxylic acid component and an aromatic diamine component in essentially equimolar amounts which are dissolved in a polar organic solvent, wherein the aromatic tetracarboxylic acid component comprises at least 60 mole % of 2,3,3',4'-biphenyltetracarboxylic acid, its monoester or diester of a primary alcohol, or their mixture, and the aromatic diamine component comprises at least 55 mole % of 4,4'-diaminodiphenyl ether, wherein the aromatic diamine component further comprises at most 30 mole % of 1,3-bis(4-aminophenoxy)-benzene.

* * * * *